Patented Aug. 31, 1926.

1,597,964

UNITED STATES PATENT OFFICE.

WILHELM GLUUD, OF DORTMUND, GERMANY. REISSUED

METHOD OF REMOVING SULPHURETED HYDROGEN FROM GASES.

No Drawing. Application filed September 11, 1922, Serial No. 587,581, and in Germany September 20, 1921. Renewed July 24, 1926.

It has already been proposed to extract sulphureted hydrogen from gases by means of copper-salt-solutions, the copper sulphide formed being then reconverted into a soluble form, and the washing liquid being regenerated by treating with air. The fact has now been established that besides copper, also nickel may be converted into a soluble form from its sulphides by being treated with oxygen or oxygenous gases or mixtures of gases, such, for instance, as air.

Employing nickel instead of copper for the purpose in view yields great technical profits, quite apart from the further fact that a novel property of nickel has been discovered. It has been found that the decomposition of the nickel sulphide proceeds mostly in this way that the sulphur bound to the nickel is separated as elementary sulphur. Besides, the reaction between the air and the nickel proceeds quicker than with copper, in consequence of which, in carrying the process through technically, the units necessary for the regeneration of the washing liquid may be considerably smaller whereby a considerable profit is obtained.

The process may be carried through in very many ways by either adding, or not adding, substances of certain kinds to the nickel-salt-solution. Such substances may be for instance such salts, bases and the like, which do not cause a precipitation of the nickel from its solutions viz. ammonia, pyridine, ammonium sulphate, ammonium chloride, sodium chloride salts of organic acids, etc. Washing the gas and treating the liquid with air may be effected at ordinary temperature or at a higher one, and the air may have atmospheric pressure or a lower or a higher one. In this latter case the carrying through of the process is considerably accelerated.

Example.

A gas containing sulphureted hydrogen is passed into a solution of 1,5 per cent of nickel-sulfate, 2 per cent of ammonia and 3-10 per cent of ammonium-sulfate, until the greater part of the nickel has been precipitated. A rapid current of air entering at the bottom of the liquid is then passed through the solution. After some time the black sulphide has disappeared and yellowish sulphur collects at the surface of the blue ammonia-nickel-solution. The best results are obtained if a long tube (1,5-2 m. long) is used for the experiment.

The regenerated solution may be used for the same purpose.

Having now described what I claim as new and desire to secure by Letters Patent of the United States is:

1. The process of removing sulphureted hydrogen from gases which consists in subjecting the gas to the action of a nickel-salt solution and treating the sulphide obtained thereby with a gas containing oxygen.

2. The process of removing sulphureted hydrogen from gases which consists in subjecting the gas to the action of a nickel-salt solution in presence of substances able to form nickel-compounds which are soluble in alkaline liquids and precipitable by hydrogen sulphide and treating the sulphide obtained in the liquid with a gas containing oxygen.

3. The process of removing sulphureted hydrogen from gases which consists in subjecting the gas to the action of a nickel-salt solution in presence of ammonia and treating the sulphide obtained in the liquid with a gas containing oxygen.

4. The process of removing sulphureted hydrogen from gases which consists in subjecting the gas to the action of a nickel-salt solution in presence of a salt which is incapable of precipitating the nickel from the solution and treating the sulphide obtained in the liquid with a gas containing oxygen.

5. The process of removing sulphureted hydrogen from gases which consists in subjecting the gas to the action of a nickel-salt solution in presence of substances able to form nickel-compounds which are soluble in alkaline liquids and precipitable by hydrogen sulphide and of a salt which is incapable of precipitating the nickel from the solution and treating the sulphide obtained in the liquid with a gas containing oxygen.

6. The process of removing sulphureted hydrogen from gases which consists in subjecting the gas to the action of a nickel-salt solution in presence of ammonia and a salt, which is incapable of precipitating the nickel from the solution and treating the sulphide obtained in the liquid with a gas containing oxygen.

7. The process of removing sulphureted hydrogen from gases which consists in subjecting the gas to the action of a nickel-salt solution in presence of salts which are incapable of precipitating the nickel from the solution and treating the sulphide obtained in the liquid with a gas containing oxygen.

8. The process of removing sulphureted hydrogen from gases which consists in subjecting the gas to the action of a nickel-salt solution in presence of substances able to form nickel-compounds which are soluble in alkaline liquids and precipitable by hydrogen sulphide and of salts which are incapable of precipitating the nickel from the solution and treating the sulphide obtained in the liquid with a gas containing oxygen.

9. The process of removing sulphureted hydrogen from gases which consists in subjecting the gas to the action of a nickel-salt solution in presence of ammonia and salts which are incapable of precipitating the nickel from the solution and treating the sulphide obtained in the liquid with a gas containing oxygen.

10. The process of removing sulphureted hydrogen from gases which consists in subjecting the gas to the action of a solution containing nickel and converting the nickel bound to sulphur again into soluble form by treating the sulphide in the liquid with gases containing oxygen at a temperature other than normal.

11. The process of removing sulphureted hydrogen from gases which consists in subjecting the gas to the action of a solution containing nickel and converting the nickel bound to sulphur again into soluble form by treating the sulphide in the liquid with gases containing oxygen under a pressure other than normal.

12. The process of removing sulphureted hydrogen from gases which consists in subjecting the gas to the action of a solution containing nickel and converting the nickel bound to sulphur again into soluble form by treating the sulphide in the liquid with gases containing oxygen of a pressure and at a temperature other than normal.

In testimony whereof I affix my signature.

Dr. WILHELM GLUUD.